Dec. 10, 1957  K. CLARK  2,815,923
VALVE WITH AUTOMATIC RATE-OF-FLOW CONTROL
Filed July 23, 1952  2 Sheets-Sheet 2
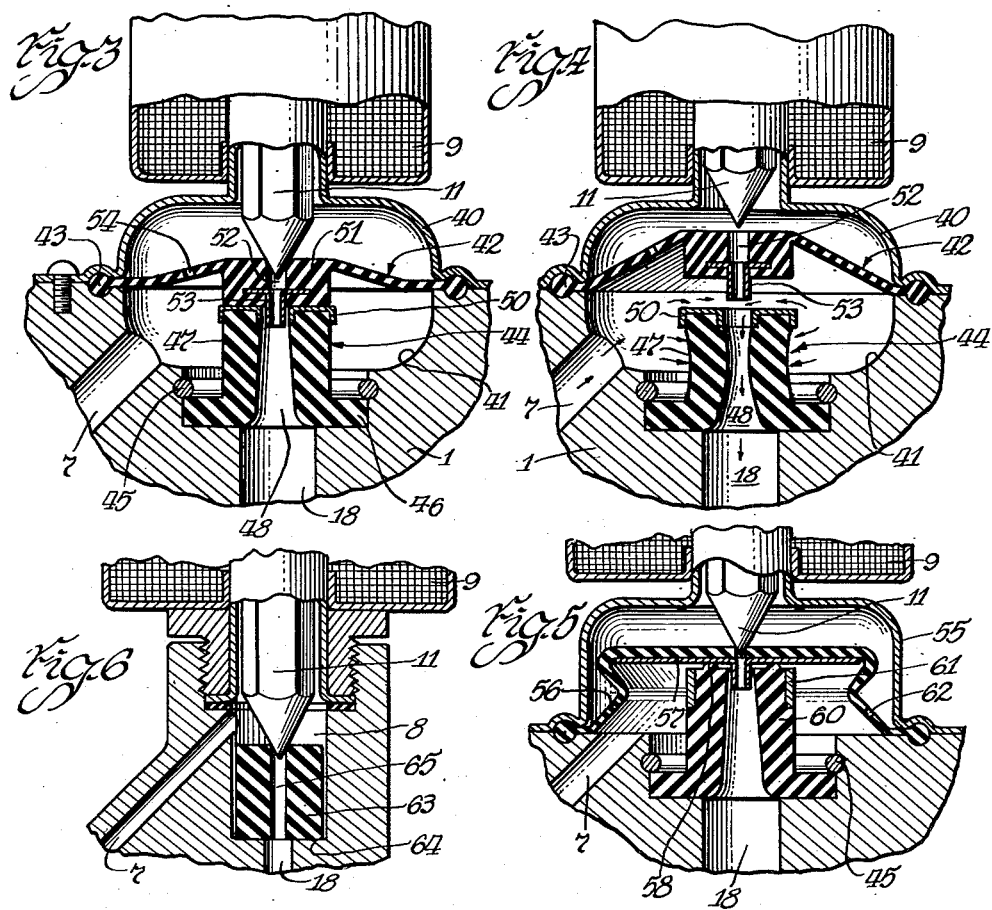
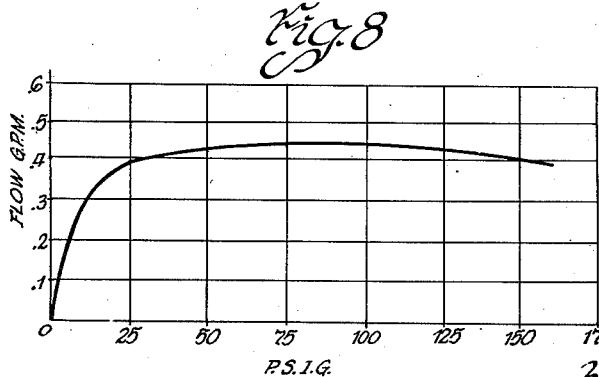
Inventor
Kendall Clark

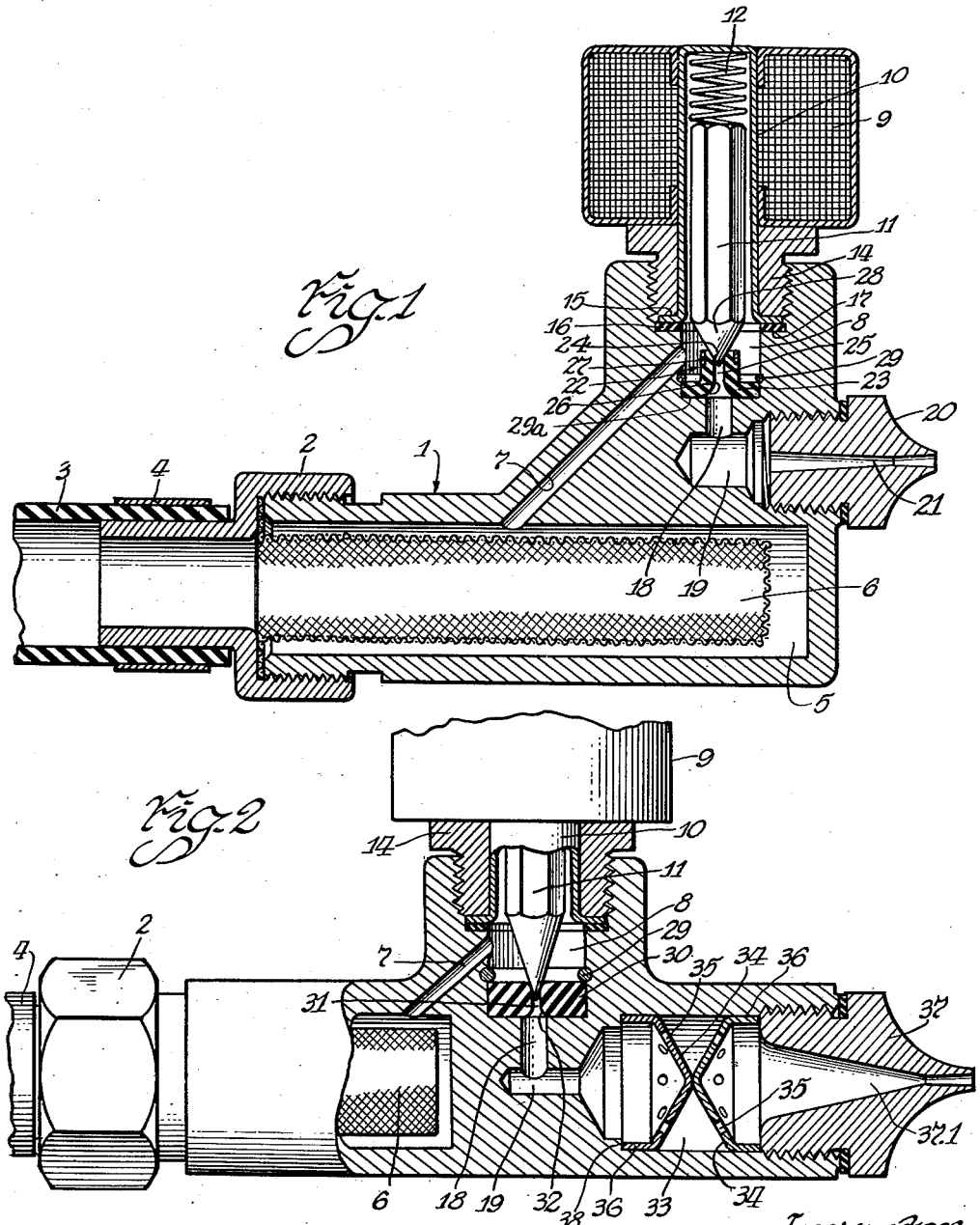

United States Patent Office 2,815,923
Patented Dec. 10, 1957

2,815,923

VALVE WITH AUTOMATIC RATE-OF-FLOW CONTROL

Kendall Clark, Glen Ellyn, Ill., assignor to General Electric Company, a corporation of New York Application July 23, 1952, Serial No. 300,411

5 Claims. (Cl. 251—120)

This invention relates to valves for fluid control and, in particular, to a valve having a valve seat element which comprises, when the valve is opened to fluid-flow, a control member insuring a substantially constant rate of flow over a wide range of pressure differentials across the valve element.

It is a principal object of the invention to provide a simple and inexpensive valve assembly which will not only perform usual valving functions, but without attachments or accessories operate as a rate-of-flow control which will automatically compensate for variations in pressure differential.

It is another object of the invention to provide a combined valve and rate-of-flow control device in which an elastic valve seat element constitutes the flow control unit.

It is a further object of the invention to provide a valve as aforesaid, in which the flow control element is quickly available for inspection or replacement.

It is still another object of the invention to provide in a valve, an elastic, flow-regulating valve seat member and a cooperating valve element which when unseated insures non-turbulent fluid flow through the seat member, thereby improving the rate-of-flow control characteristics of said member.

It is another object of the invention to provide a valve as aforesaid, which is simple to manufacture and install, has an improved strainer at the upstream side, and an improved discharge portion which produces a non-spraying water jet.

Although valves utilizing my invention are useful in many types of installation, it is particularly advantageous as the fill valve of an automatic washing machine. In such machines a predetermined amount of wash water or rinse water is introduced into the tub at various periods under control of a time-cycle switch or other arrangement. Generally speaking, there are two methods for establishing the required amount of water: by having the water overflow into a sump provided with a float switch or equivalent which operates to close the water valve, or to introduce water at a pre-established rate of flow for a time period sufficient to yield the desired quantity. The latter system is by far the simpler, but it is subject to line pressure variations; and these may be extreme and are often unpredictable in domestic plumbing installations.

It has been the practice to install elastic flow control devices at a suitable point in the inlet line to the washing machine, for automatic flow control adjustment according to variations in line pressure. I am also aware of a conventional water inlet valve having a conventional flow control device added to its downstream or discharge portion; but insofar as I am aware, no prior art device realizes or utilizes the advantages of forming the rate of flow control as a readily replaceable element of the valve itself, and in particular, using the control element as the valve seat element.

My valve is also useful in clothes driers of the type in which a spray of cold water within a sealed air circulation chamber condenses out the moisture content of the air which has circulated through the damp clothes in a tumbling drum. A presently commercially successful drier of this type creates the water spray by shooting a stream of water across an air gap and into the chamber, where it strikes a target which breaks up the stream into a myriad of small water particles through which the humid air circulates. It is important that a uniform quantity of liquid at substantially uniform pressure be discharged against the target, and that the stream of water issuing from the valve discharge be steady and without side spray or splashing, or otherwise water might accumulate on the floor of the room in which the drier is located. As will later appear, it is a feature of my invention that the discharging stream is steady and non-splashing.

Other features and advantages of the invention will be apparent from the following detailed description of presently preferred embodiments read in connection with the accompanying drawings in which:

Fig. 1 is a side sectional elevation of a valve incorporating one form of flow control device;

Fig. 2 is a partial side sectional elevation of a second valve using a slightly different flow control element and a means for steadying the fluid discharging from the valve;

Figs. 3 and 4 are fragmentary side elevations of a valve of the fluid-pressure operating type, the valve being closed in Fig. 3 and opened in Fig. 4;

Fig. 5 is a representation of a valve utilizing still another form of flow control device;

Figs. 6 and 7 represent still another embodiment of a solenoid operated valve utilizing a flow control device as the valve seat member, the figures respectively showing the valve in open and closed position; and Fig. 8 is a rate-of-flow chart prepared from test data of a valve of the type shown in Fig. 1.

In the several figures, the valves have been illustrated as of the solenoid operated type as used, for example, in domestic clothes washing machines and laundry driers in which water is required to flow into the apparatus for predetermined times during the operational cycle. It should be understood, however, that any type of manual or automatic valve operation may be employed.

In Fig. 1, the valve comprises a body 1 having an inlet which may be provided with a union or other fitting 2 to which is suitably attached a conduit 3 through which fluid—for example, water at line pressure—may flow. In a domestic washing machine or drier installation, the conduit 3 may be a suitable rubber hose fastened by a clamp 4 or equivalent to the fitting 2; the other end of the hose may have a bibb fitting (not shown) for screw-threaded application to a faucet on a laundry tray (not shown). It will be understood that the valve will be mounted on the washing or other machine (not shown) to discharge into a water-receiving chamber or portion thereof. A relatively large inlet chamber 5 is preferably fitted with an elongated sleeve-like strainer 6. It will be apparent that the water must pass through the strainer before it can reach the passage 7 leading to valve chamber 8. The apertures of the strainer may be individually very small, but cumulatively have a flow capacity very much greater than that of passage 7. The large effective area of the strainer permits it to function satisfactorily without creating undesirable back pressure even after a long period of use. As clearly appears, the open end of the strainer is flanged and seats between the shoulder on the fitting 2 and the end wall of the valve body. Thus, the strainer is easily accessible and removable for cleaning or replacement.

In the illustrated type of valve, the valve actuator includes the somewhat schematically shown electro-magnetic coil 9 encased in a structure which may be fitted tightly over the non-magnetic sleeve 10 which guides the magnetic valve element 11. When the coil 9 is energized its magnetic effect will draw the valve element upwardly against the bias of the coil spring 12. The sleeve 10 is mounted in the valve body by any suitable means; for example, by the cooperation of the sleeve nut 14 with the flange 15 formed at the base of the sleeve 10. Because the chamber 8 is exposed to full line pressure, a gasket 16 is interposed between the flange 15 and a suitable shoulder 17 of the valve body. It will be apparent that merely by unscrewing the nut 14, the valve chamber 8 may be opened for inspection of the valve elements therein.

The downstream side of the valve has appropriate passages 18, 19 communicating with chamber 8. The exact arrangement of the discharge portion of the valve is determined largely by the end use of the valve. The male threaded discharge fitting 20 is useful when the valve discharge must traverse an air gap as required by some plumbing codes to protect against back-siphonage. The fitting 20 has a venturi-type bore 21 which produces a non-spraying stream.

The combined valve seat and flow regulator 22 in the Fig. 1 form is molded from the synthetic elastic material known as Buna-N, having a durometer rating of 50 plus or minus 5. This is the material of which was made the unit which produced the test results shown in Fig. 8. It is, of course, probable that other elastomers will give satisfactory results. Member 22 has a base portion 23 which seats on a shoulder 29a at the bottom of chamber 8. From said base portion rises a tubular body portion of relatively smaller outside diameter. Said body portion controls flow through the axial valve seat passage, as presently described. Said passage is concentric with passage 18 and has three clearly definable parts: a rounded entrance 24 which serves as the valve seat; a substantially cylindrical intermediate passage 25; and an outlet defined by the relatively large radius wall 26. Depending upon the size and passage diameter of the member 22, there may or may not be used a reinforcing band 27 about the entrance portion.

The tapering end 28 of the plunger 11 enters the valve seat member 22 when the solenoid is de-energized, and because of the resilience of the member, the resulting engagement of the end 28 with the wall of entrance 24 provides a suitably tight closure. A snapring or equivalent 29 seating within a suitable groove in the wall of the chamber 8 maintains the position of the valve member 22 on the shoulder 29a at the base of the chamber.

When the coil is energized, valve element 11 lifts away from the valve seat member 22. The valve seat passage has certain characteristics of a venturi and the velocity pressure of liquid flowing through the portion 25 of the bore becomes less than the static pressure of liquid surrounding the member 22 within chamber 8. The elastic wall of the member in the free-standing barrel portion above base 23 therefore necks inwardly in relation to the magnitude of the differential pressure. The contraction of the passage 25 reduces the flow and increases the fluid pressure within the element. This increased pressure reduces the differential between the velocity pressure and the static pressure, which results in less effort tending to distort the barrel of the member 22, whereupon it will move in the direction establishing its normal diameter. Because the velocity of flow through member 22 is directly related to the pressure drop thereacross, and because in apparatus where the discharge is into the open air the back pressure on the downstream side of the valve is small, it may be considered that the pressure drop across the valve is represented by the line pressure evidenced in chamber 8. In domestic plumbing, the line pressure may vary greatly and, hence, the velocity pressure within the member 22 will vary. But because the actual flow rate through the valve member 22 is influenced by the relation between the static pressure about the member and velocity pressure within the member, variation in line pressure brings about a continuing adjustment of the flow capacity of the element 22. When the line pressure drops the rate of flow through the valve drops, and the bore of the valve member increases to permit more flow under the reduced pressure differential then prevailing. Thus, by sizing the bore of the valve member 22 and selecting its elastic qualities for a desired flow rate at a base line pressure, the flow rate remains quite constant at other line pressures within a rather wide range, as indicated in Fig. 8.

In Fig. 2, all elements similar to the elements of Fig. 1 in structure and function have been given the same reference characters as their Fig. 1 counterparts. The combination valve seat and flow control member 30 comprises a relatively heavy elastic washer having suitably rounded entrance and exit portions and a substantially cylindrical bore 31. It will be noted that the bore is of considerably smaller diameter than the outlet passage 18, thereby leaving an unsupported annular rim 32 at the discharge end of the valve element. When the valve element 11 is raised upon energization of the solenoid 9, the fluid pressure differential within the chamber 8 and the bore 31 causes the washer to dish downwardly, constricting the upper portion of the bore 31 and somewhat enlarging the area at the discharge portion. This action provides the fluid flow adjustment necessary to maintain the rate of flow at substantially the desired level.

The discharge portion of the valve body has a relatively large chamber 33 housing a device which reduces turbulence of the discharging fluid. A preferred form of turbulence-reducing device comprises a pair of conical elements 34 arranged vertex-to-vertex as shown. Each element has a plurality of orifices 35 preferably arranged in a ring of equal radius. A skirt 36 defining the base of each element serves accurately to position the elements within the cavity. As shown, the base of nozzle 37 engages the skirt of one of the elements and is effective to drive the other against the seat 38 of the base of chamber 33.

The ports 35 of the downstream element slope according to the slope of the cone, to guide the outflowing liquid smoothly into the relatively large conical entrance passage 37.1 of the discharge fitting. As in the Fig. 1 embodiment, the passage through the fitting has venturi characteristics accommodating the liquid flow with little pressure drop. The combination of the turbulence correctors 34 and the large-entrance discharge fitting 37 produces a clean, non-spraying, stream.

Figs. 3, 4, and 5 show an adaptation of my invention to valves of the fluid-pressure operated type. The respective valve bodies 1 have inlet passages 7 and outlet passages 18 communicating with a valve chamber. In Figs. 3 and 4 the valve chamber is formed by a domed portion 40 providing the base of the solenoid armature guide sleeve, and a cavity 41 in the body of the valve. The valve chamber is divided into upper and lower portions by a diaphragm 42 having a gasket-forming rim 43 effective to create a liquid tight seal when the domed structure is screwed or otherwise fastened to the valve body. The combined flow control member and valve seat 44 seats within a pocket at the base of the valve cavity 41 and may be held therein by a snapring 45 overlying the flange 46. The valve element is characterized by the upstanding elastic barrel portion 47 having an axial bore 48 which, as shown, may slope outwardly in a downstream direction. The bore 48 is concentric with the outlet passage 18. The valve seating portion comprises a flat upper surface of appreciable width, and to that surface is applied a facing 50 of suitable material such as thin brass or other metal suitable to withstand any corrosive action of the material being handled by the valve. Instead of a plating of metal the facing may comprise a hard plastic member bonded to the valve member.

The diaphragm 42 has a central portion 51 in the form of a cylinder having an outside diameter substantially equal to that of the valve element 44. The axial bore 52 of the diaphragm portion 51 is not related to the diaphragm of the passage 48, but rather to the rate of flow through a diaphragm bleeder passage 54. To act as a pilot for insuring the proper seating of the diaphragm on the valve member, and as a means for better establishing the rate of flow through passage 52, it is advantageous to mold into the cylindrical portion 51 a ferrule 53 having a tubular extension which enters the valve member 44 when the diaphragm is moved to closed position. The bleeder passage 54 is of substantially less diameter than passage 48, and is less than the passage through the ferrule 53. When in closed position, the nose of the magnetic valve element 11 rests in contact with the upper rim of the diaphragm passage 52, forcing the diaphragm downwardly to seat on the facing 50 of the valve element. This action of the plunger is aided by the fact that fluid pressures above and below the diaphragm come into balance by reason of the bleeder opening 54; and when the diaphragm is seated in its Fig. 3 position, the relatively larger area of the upper face of the diaphragm establishes a pressure differential in favor of maintaining the diaphragm on its seat. When the plunger is raised the liquid pressure above the diaphragm is relieved through the ferrule 53. Liquid can flow through 53 faster than it enters the upper valve chamber space through aperture 54, whereupon the liquid pressure below the diaphragm causes it to lift, permitting full flow through the valve member 44. The condition then is similar to that of Fig. 1; head pressure within the valve chamber is greater than the velocity head through the passage 48 causing the barrel portion of the valve element to neck inwardly to regulate the rate of flow according to the pressure differential.

In Fig. 5 the valve chamber is formed by the substantially cylindrical dome 55. Diaphragm 56 has a broad annular plate 57 arranged to seat against a bead 58 on the elastic valve seat element 60. The upper end of the barrel portion of the valve element is advantageously reinforced by the band 61. The diaphragm bleeder opening 62 causes the embodiment of Fig. 5 to operate in all respects like that of Figs. 3 and 4.

In Figs. 6 and 7, the combined valve seat and flow control member comprises a heavy elastic sleeve 63 fitting easily within a cavity 64 in the base of valve chamber 8. The passage 65 through the sleeve is of small diameter relative to the outside diameter of the sleeve. Preferably, the passage 65 is smaller than the outlet passage 18. The magnetic valve element 11 normally seats within the passage 65 to stop fluid flow as previously described. When the valve element is raised to permit flow through the passage 65 (see Fig. 7) the passage 65 is reduced according to the pressure within the valve chamber 8. It will be understood that the sleeve 63 is not bonded to the side wall of the cavity 64, and in fact, it is preferable that there be a slight clearance between the sleeve and the valve body cavity so that the fluid pressure within the chamber 8 will be exerted against the outer wall of the sleeve as well as against the exposed end wall thereof. The differential pressures cause a radial and axial distortion of the valve seat member 63.

The flow curve of Fig. 8 represents actual performance of a valve as shown in Fig. 1, sized for laundry drier service. The acceptable rate of flow for such service was between .32 and .48 gallon per minute. It will be noted that this flow rate was maintained over a pressure range of from 10 to 160 p. s. i., and that between 25 and 75 p. s. i., the pressure variation most frequently encountered in domestic plumbing, the variation in flow rate was only .02 gallon per minute.

It is considered that an important contributor to the effectiveness of the elastic valve seat element in controlling flow as shown in Fig. 8 is the smooth, non-turbulent flow through said element, resulting from the configuration of the end portion 28 of the cooperating valve element 11 and its relation to the entrance 24 of the valve seat aperture. The lift of the valve element 11 is not great, and the tip of said element remains sufficiently close to the entrance to direct flow smoothly thereinto. It will be understood that a conical configuration for the portion 28 is not required; other configurations—for example, spherical or parabolic—provide wall surfaces which form an effective flow guide. Basically, I consider that the portion 28 should be a surface of revolution about an axis substantially concentric with the valve seat passage, with the smallest radius being at the tip.

The simplicity of assembly of a valve embodying my invention, plus the ready availability of the valve seat member upon removal of the valve chamber closure plate makes it easy to replace a valve seat element with one designed to fill radically different flow requirements. It is not necessary to break the piping, as is the case when the flow control element is an independent device installed in the piping or interposed between the valve body and the nozzle piping. For such a replacement, it is necessary only to pry out or otherwise release the snapring, and replace the existing valve seat element with one having the necessary aperture diameter and/or elasticity factor.

While there has been described what are at present considered to be the preferred embodiments of the invention, it will be understood that various modifications may be made therein, and it is intended to cover in the appended claims all such modifications as fall within the true spirit and scope of the invention.

I claim:

1. In a valve, a body having a valve chamber and inlet and outlet passages respectively communicating therewith, a tubular valve seat element disposed in said chamber at the entrance to said outlet passage and having an axial passage in direct communication therewith, said axial passage, commencing at its inlet end, being of substantially less diameter than said outlet passage and thereupon gradually increasing in diameter, said valve seat element being of elastic material subject to distortion in radial and axial directions responsive to an increase in pressure differential between the fluid pressure within said valve chamber and the pressure within said axial passage during flow therethrough, means encircling said valve seat element at the inlet end thereof to maintain a fixed-diameter orifice and thereby limit radial distortion of said element to the body portion thereof downstream of said inlet, a cooperating valve element within said chamber, and means for moving said cooperating valve element into or out of engagement with said valve seat element to stop or permit fluid flow therethrough.

2. In a valve, a body having a valve chamber and inlet and outlet passages respectively communicating therewith, a valve seat element disposed in said chamber at the entrance to said outlet passage and having an axial passage therethrough in direct communication therewith, said axial passage at the mid-portion thereof, being of less diameter than the diameter of said outlet passage, a body portion of said valve seat element defining said axial passage being of less diameter than the diameter of the valve chamber and of elastic material subject to distortion in a radially inward direction responsive to an increase in the fluid pressure within said valve chamber relative to the pressure within said axial passage during flow therethrough, means for restraining the inlet end of said valve seat element against radial expansion, a cooperating valve element movable into or out of engagement with the inlet end of said valve seat element to stop or permit fluid flow therethrough, and means for moving said cooperating valve element in the desired directions.

3. In a valve, a body having a valve chamber and inlet and outlet passages communicating therewith, a removable closure for said chamber disposed opposite said outlet passage, a valve seat element disposed within a cavity in the base of said chamber at the entrance to said outlet passage, said valve seat element having an axial flow passage communicating between said chamber and said outlet passage, said axial flow passage, at the mid-portion thereof, being of substantially less diameter than the diameter of said outlet passage and thereupon increasing gradually to the diameter of said outlet passage, said valve seat element having an enlarged base portion and a relatively smaller upstanding body portion extending into said chamber in spaced relation to the walls thereof, the body portion of said valve element forming the wall of said axial passage being radially distoratable in response to a change in pressure differential between the fluid pressure within said chamber and the pressure within said axial passage during fluid flow therethrough, means disposed between the wall of said cavity and said valve element base portion to retain said element within said cavity, a cooperating valve element movable into or out of engagement with the body wall of said valve seat element at the entrance to said axial passage to stop or permit fluid flow therethrough, means encircling said valve seat element at the inlet end thereof to maintain a fixed-diameter orifice and thereby limit radial distortion of said element to the body portion thereof downstream of said inlet, means for guiding said cooperating valve element for movement in the desired directions, spring means biasing said cooperating valve element into movement in one direction, and electro-magnetic means for inducing movement of said element in the opposite direction.

4. A valve according to claim 2 in which said inlet end restraining means comprises a rigid cap member extending about the top and upper outside wall of said valve seat member.

5. In a valve, a body having a valve chamber and inlet and outlet passages respectively communicating therewith, a valve seat element secured within said chamber at the entrance of said outlet passage, said element having an elastic tubular body portion of substantially less outside diameter than said chamber and an axial passage concentric with said outlet passage; the axial passage of said valve seat element, commencing at its inlet end and extending for the greater portion of said elastic body portion, being of substantially smaller diameter than said valve body outlet passage and then increasing to said valve body outlet passage diameter; means on said valve seat element at the base thereof preventing flow of liquid from said valve body chamber into said valve body outlet passage except through said valve seat element passage, whereby said valve element elastic body portion is subject to the differential in pressure between the velocity head of pressure of fluid flowing through said valve seat element and the static head of fluid within said valve chamber for radial expansion or contraction for control of flow into said valve outlet passage according to said pressure differential, a cooperating valve element movable into or out of direct engagement with said valve seat element at the inlet end thereof to stop or permit fluid flow therethrough, and means for effecting movement of said cooperating valve element in the desired directions.

References Cited in the file of this patent

UNITED STATES PATENTS

| | | |
|---|---|---|
| 2,050,430 | Erickson | Aug. 11, 1936 |
| 2,293,957 | Wells | Aug. 25, 1942 |
| 2,327,542 | Matteson | Aug. 24, 1943 |
| 2,328,805 | Holthouse | Sept. 7, 1943 |
| 2,500,750 | Halenza | Mar. 14, 1950 |
| 2,506,152 | Hunter | May 2, 1950 |
| 2,562,315 | Kempton | July 31, 1952 |
| 2,619,116 | Ralston | Nov. 25, 1952 |
| 2,638,927 | Walker | May 19, 1953 |

FOREIGN PATENTS

| | | |
|---|---|---|
| 266,962 | Switzerland | May 16, 1950 |